United States Patent Office

3,527,797
Patented Sept. 8, 1970

3,527,797
PRODUCTION OF ACRYLIC ACID
Richard Krabetz, Ludwigshafen (Rhine), Heinz Engelbach, Limburgerhof, Pfalz, and Helmut Zinke-Allmang, Bad Durkheim, Germany, assignors to Badische Anilin- & Soda-Fabrik Aktiengesellschaft, Ludwigshafen (Rhine), Germany
No Drawing. Filed Oct. 17, 1967, Ser. No. 675,760
Claims priority, application Germany, Oct. 25, 1966, 1,568,200
Int. Cl. C07c 51/32
U.S. Cl. 260—533          9 Claims

ABSTRACT OF THE DISCLOSURE

Production of acrylic acid by reaction of 1 part by volume of propylene with 1.5 to 10 parts by volume of molecular oxygen in the form of a gas containing 10 to 30% by volume of oxygen in the presence of 1 to 10 parts by volume of steat at temperatures of 300° to 400° C. using a catalyst which contains molybdenum, tungsten, tellurium and iron and/or nickel and/or copper and/or manganese in an atomic ratio of 1 to 20:0.01 to 20:0.001 to 1:1 and also oxygen. Acrylic acid is suitable for the production of polymers.

---

This invention relates to an improved process for the production of acrylic acid by oxidation of propylene with gas containing oxygen.

It is known from U.K. Patent specification No. 903,034 that acrylic acid is obtained by oxidation of propylene in the presence of catalysts which contain iron and tungsten besides molybdenum and oxygen. Another process described in the published specification of Netherlands Patent application No. 6501294, uses, for the oxidation of propylene to acrylic acid, catalysts which contain molybdenum and tungsten in addition to antimony, vanadium and oxygen. These processes have the disadvantage that acrylic acid is obtained in yields of only up to about 15% with reference to the propylene used. It is further known from French Patent specification No. 1,425,871 that when using catalysts which contain tungsten, tin, molybdenum, tellurium and oxygen in the oxidation of propylene to acrylic acid, good yields of acrylic acid are obtained. In order to obtain good yields, however, temperatures of 400° C. and more have to be used. Molybdenum trioxide and tellurium dioxide are however partly volatile at such high temperatures under the reaction conditions so that the activity of the catalyst is considerably impaired. Furthermore it is stated in Belgian Patent specification No. 641,143 that propylene can be oxidized in the presence of catalysts which, in adidtion to oxygen, iron and antimony as activators, contain at least one of the metals: bismuth, copper, tin, germanium, tellurium, cobalt, manganese, lead, molybdenum, thallium, barium or arsenic. The main product of the process is however acrolein.

It is an object of this invention to provide an improved process for the production of acrylic acid in which acrylic acid is obtained in high yields. A further object of the invention is to provide a process in which the catalysts used retain a high activity over long periods.

In accordance with this invention these and other objects and advantages are achieved in an improved process for the production of acrylic acid by reaction of propylene with gas containing molecular oxygen in the presence of steam and a catalyst at elevated temperature in which the improvement comprises using a catalyst which contains (in addition to oxygen, molybdenum, tungsten and tellurium) iron and/or nickel and/or copper and/or manganese.

The propylene used generally contains small amounts of other hydrocarbons, such as ethane, propane, butane or butylene. The propylene content is advantageously more than 85% by volume, preferably more than 98% by volume. The gas containing molecular oxygen in general has an oxygen content of 10 to 30% by volume. It is advantageous to use a gas which contains 15 to 25% by volume of oxygen, particularly air. Apart from oxygen, the gas contains inert components, such as nitrogen, carbon dioxide or argon. It is advantageous to use 1.5 to 10 parts by volume of oxygen, particularly 2 to 3 parts by volume of oxygen, for each part by volume of gaseous propylene. The ratio by volume of gaseous propylene to steam is in general 1:1 to 1:10, preferably 1:3 to 1:8.

The reaction is advantageously carried out at temperatures of from 300° to 400° C. Particularly good results are obtained by carrying out the process at temperatures of 320° to 350° C. The oxidation is carried out in the gas phase and it is advantageous to ensure that the time of contact of the starting materials with the catalyst is from one to twenty seconds, preferably from six to fifteen seconds.

Preferred catalysts contain (besides oxygen, molybdenum, tungsten and tellurium) iron and/or nickel and/or copper and/or manganese in the atomic ratio: molybdenum:tungsten:tellurium : iron/nickel/copper/manganese of 1 to 20:0.01 to 20:0.001 to 1:1, particularly 2 to 10:0.1 to 4:0.01 to 0.6:1. The said metals may be present in the catalysts as mixtures of oxides or as compounds with one another. The catalysts may be prepared for example by allowing a solution of iron chloride or sulfate and/or nickel chloride or sulfate and/or copper chloride or sulfate and/or manganese chloride or sulfate in water to flow into an aqueous solution of ammonium paramolybdate, ammonium paratungstate and telluric acid. It is advantageous to carry out the precipitation in the presence of ammonium salts or nitrogen bases. A precipitate then separates which is washed with water, dried for example for ten to fifteen hours at 110° to 130° C. and then advantageously heated for three to twenty hours in a current of air at 300° to 700° C., preferably 350° to 450° C. It is also possible to incorporate tellurium into the catalyst as telluric acid, tellurium dioxide or salts of telluric acid after the precipitate which contains the remaining metals has been dried, for example by kneading. According to another method, the catalysts may be prepared by mixing readily decomposable salts of the metals, such as acetates, formates, oxalates, chlorides or nitrates, and then decomposing them by heat. In this case also, the telluric acid, tellurium dioxide or salts of telluric acid may be introduced into the catalyst mixture subsequently.

The process according to the invention is carried out for example by arranging a catalyst of the said composition in a reaction tube and passing a mixture of propylene and gas containing oxygen together with steam in the said ratio over the catalyst bed at the said temperature and for the said residence time. The hot reaction gas is rapidly cooled, for example with water, and washed, the acrylic acid formed thus being dissolved in water. Any acrolein formed can be returned to the reaction after it has been separated from the acrylic acid or may be oxidized to acrylic acid in a second stage. It is also possible to supply the hot gas containing acrylic acid and acrolein (without cooling it or washing it) to a second oxidation stage in which acrolein is oxidized to acrylic acid, with or without further addition of oxygen-containing gas. It is advantageous to recycle the wash water so that acrylic acid accumulates in the water. The acrylic acid may be advantageously extracted from the enriched aqueous solution with an organic solvent, such as ethyl acetate. After the aqueous phase has been separated, for example by decanting it, the acrylic acid is isolated from the extract by fractional distillation.

Acrylic acid prepared by the process according to the invention is suitable for the production of polyacrylic acid (Houben-Weyl, "Methoden der organischen Chemie," Georg Thieme Verlag Stuttgart, 1961, vol. 14/1, p. 1018).

The invention is illustrated by the following examples in which the parts specified are parts by weight, unless stated otherwise. They bear the same relation to parts by volume as the kilogram (S.T.P.) to the liter.

EXAMPLE 1

A mixture of 55 parts of ammonium paratungstate, 445 parts of ammonium paramolybdate, 34 parts of telluric acid and 113 parts of ammonium chloride is introduced in portions into 1800 parts of boiling water. A solution of 133 parts of iron(III) chloride in 150 parts of water is then allowed to flow into the boiling solution in the course of twenty minutes. During this operation a precipitate separates out. The aqueous suspension is cooled while stirring and the precipitate is filtered off and freed from adherent impurities by suspending it three times in 10,000 parts of water. The precipitate thus obtained is dried for twelve hours at 120° C. and then heated for four hours at 400° C. in a current of air. The catalyst mixture obtained is comminuted and screened, the screen fraction from 2 to 5 mm. being further used. The finished catalyst contains molybdenum, tungsten, tellurium and iron in the atomic ratio 5.1:0.42:0.5:1.

1 part by volume of the said catalyst, which has a particle size of 2 to 5 mm., is arranged in a reaction tube. 30 parts by volume of propylene, 400 parts by volume of air and 280 parts by volume of steam are passed per hour through the reaction tube at 340° C. The gas obtained is analysed by gas chromatographic methods. The propylene introduced is converted to the extent of 43% into acrylic acid, 3.9% into acrolein and 42.4% into other products. 10.7% of the propylene is recovered unchanged.

If the atomic ratio in the above-mentioned catalyst is varied and the oxidation of propylene is carried out in the manner described, the yields of acrylic acid set out in the following table are obtained:

TABLE

| Atomic ratio of catalyst, Mo:W:Te:Fe | Yield of— | |
|---|---|---|
| | Acrylic acid | Acrolein |
| 5.1:0.42:0.15:1 | 26.9 | 1.5 |
| 5.1:0.42:0.30:1 | 43 | 3.9 |
| 5.1:0.42:0.50:1 | 54 | 3.2 |
| 3.9:1.70:0.50:1 | 27 | 1.7 |
| 4.7:0.83:0.50:1 | 30 | 14.3 |

EXAMPLE 2

The catalyst is prepared as described in Example 1 except that the telluric acid is not precipitated but incorporated after the precipitate has been dried. 8.5 parts of telluric acid dissolved in 50 parts of water is kneaded into 110 parts of dried precipitate, for two hours. The catalyst mixture is then heated for four hours in a current of air at 400° C.

1 part by volume of the said catalyst is arranged in a reaction tube and a mixture of 15 parts by volume of propylene, 150 parts by volume of air and 110 parts by volume of steam is passed thereover per hour, a temperature of 350° C. being maintained. The yield of acrylic acid according to gas chromatographic analysis is 50.8 mole percent. Acrolein and other compounds are formed only in traces. 5% of the propylene used is not reacted.

EXAMPLE 3

A mixture of 55 parts of ammonium paratungstate ($3H_2O$), 445 parts of ammonium paramolybdate ($4H_2O$) and 113 parts of ammonium chloride is introduced in portions into 1800 parts of boiling water. A solution of 93 parts of manganese (II) chloride ($1H_2O$) in 150 parts of water is then allowed to flow into the boiling solution while stirring in the course of twenty minutes. A precipitate separates out which, after the aqueous suspension has cooled, is filtered off and freed from adherent impurities by suspending it three times in 10,000 parts of water. The precipitate is dried for twelve hours at 120° C. 114 parts of the dried precipitate is suspended in 100 parts of water. The suspension is mixed with a solution of 17.2 parts of tellurium in 120 parts of a mixture of equal parts of concentrated nitric acid and water and evaporated to dryness. The mixture obtained is then dried for twelve hours at 120° C. and pressed into pellets 3 mm. x 3 mm. with an addition of 2% by weight of graphite. The pellets are then heated for four hours in a current of air at 400° C.

1 part by volume of the above-mentioned catalyst is placed in a reaction tube and 15 parts by volume of propylene, 150 parts by volume of air and 110 parts by volume of steam are passed over the catalyst, a temperature of 340° C. being maintained. 24 mole percent of the propylene introduced is converted into acrylic acid, 40 mole percent into acrolein and 26 mole percent into carbon monoxide and carbon dioxide.

We claim:
1. An improved process for the production of acrylic acid by reaction of 1 part by volume of gaseous propylene with 1.5 to 10 parts by volume of molecular oxygen in the form of gas containing 10 to 30% by volume of oxygen in the presence of 1 to 10 parts by volume of steam and a catalyst at temperatures of from 300° to 400° C., wherein the improvement comprises using a catalyst which, in addition to molybdenum, tungsten and tellurium, contains at least one of the metals iron, nickel, copper and manganese in the atomic ratio: 1 to 20Mo:0.01 to 20W:0.001 to 1Te:1Fe/Ni/Cu/Mn together with oxygen.

2. A process as claimed in claim 1 in which 2 to 3 parts by volume of molecular oxygen is used for each part by volume of gaseous propylene.

3. A process as claimed in claim 1 wherein a gas containing 15 to 25% by volume of molecular oxygen is used.

4. A process as claimed in claim 1 in which air is used as the gas containing molecular oxygen.

5. A process as claimed in claim 1 wherein 3 to 8 parts by volume of steam is used per part by volume of gaseous propylene.

6. A process as claimed in claim 1 carried out at a temperature of 320° to 350° C.

7. A process as claimed in claim 1 wherein a catalyst is used which contains molybdenum:tungsten:tellurium: iron/nickel/copper/manganese in the atomic ratio 2 to 10:0.1 to 4:0.01 to 0.6:1 in addition to oxygen.

8. A process as claimed in claim 1 wherein the period of contact of the starting materials with the catalyst is one to twenty seconds.

9. A process as claimed in claim 1 wherein the period of contact of the starting materials with the catalyst is six to fifteen seconds.

References Cited

UNITED STATES PATENTS 3,405,172  10/1968  Brown et al. _____ 260—533

LORRAINE A. WEINBERGER, Primary Examiner

D. E. STENZEL, Assistant Examiner